Jan. 6, 1959 R. H. KUXHAUS 2,867,188
METHODS AND APPARATUS FOR COATING PIPE AND THE LIKE
Filed Feb. 12, 1954

INVENTOR.
Rubin H. Kuxhaus

United States Patent Office 2,867,188
Patented Jan. 6, 1959

2,867,188

METHODS AND APPARATUS FOR COATING PIPE AND THE LIKE

Ruben H. Kuxhaus, Ponca City, Okla., assignor to Royston Laboratories, Inc., Pittsburgh, Pa., a corporation of Pennsylvania Application February 12, 1954, Serial No. 409,817

4 Claims. (Cl. 118—108)

This invention relates to methods and apparatus for coating pipe and the like, and particularly to a method and apparatus for applying cold coatings to pipe lines.

The advent of cross-country pipe transmission lines, e. g., gas and oil pipe lines has created a great need for a method and apparatus for applying protective coatings to the finished line. Many devices have been proposed to accomplish this coating operation but no one of them has been thoroughly satisfactory. One of the great disadvantages has been the inability of the coating device to operate without entirely flooding the pipe with coating material, usually by means of a reservoir above the pipe. Another disadvantage lies in the fact that virtually all of the devices heretofore proposed required that the material used be thermoplastic in nature and set up rapidly on a cool surface in order to apply a satisfactory level coat. This in turn required that the coating device be heated. There has long been a need and desire for a coating method and apparatus which would permit the application of cold coatings and particularly without the need for flooding the pipe with coating material.

I provide a method and apparatus which overcomes these defects of the prior art devices and by means of which cold pipe coatings can be successfully applied without the need for flooding the pipe being coated. Preferably I provide a sleeve member adapted to be placed over the pipe to be coated and spaced radially therefrom. Means are provided on the interior walls of the sleeve to carry coating material from the bottom of the pipe to the top thereof as the sleeve is moved around the pipe to be coated. Preferably each end of the sleeve is reduced to form an annular ring slightly larger than the outer circumference of the pipe to be coated. Resilient spreader means are provided within each annular ring to spread and level the coating on the pipe. Preferably this resilient means has a pile or nap surface made up of a multiplicity of filaments engaging the pipe surface to be coated and which act to roll the coating onto the pipe. Means are provided for rotating the sleeve about the pipe to be coated and for moving the sleeve lengthwise of the pipe.

Figure 1:
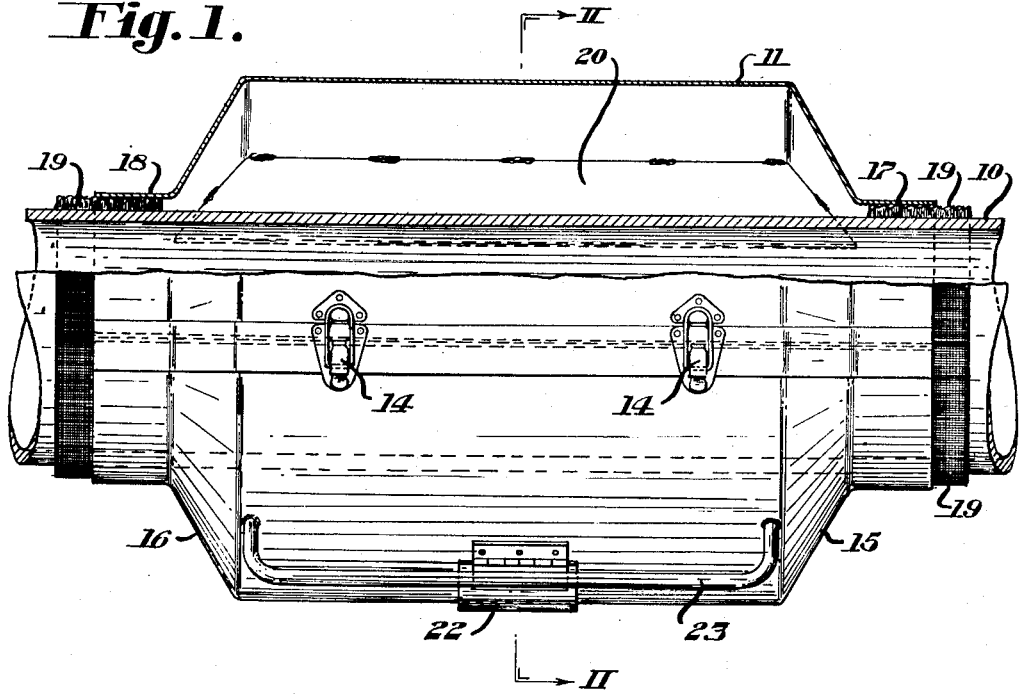
Figure 2:
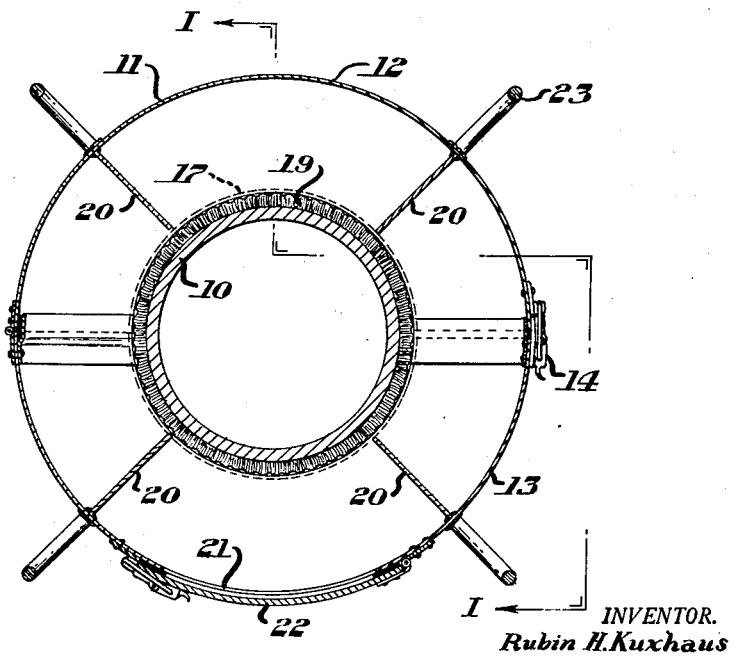

I have pointed out certain salient features and advantages of this invention, however, other features and advantages will become apparent from a consideration of the following description and the accompanying drawings in which Figure 1 is a side elevation of an apparatus according to my invention, partly in section; and Figure 2 is a section on the line II—II of Figure 1.

Referring to the drawings I have illustrated a pipe 10 to be coated. Surrounding the pipe 10 is a sleeve 11 made up of two semicyclindrical portions 12 and 13 hinged together along one edge and adapted to be fastened together by fasteners 14 to form a closed cylinder. Each end of each of the semicylindrical portions is reduced to form when closed frusto-conical portions 15 and 16 at each end of the sleeve. Axially extending flanges 17 and 18 are formed on the reduced end of each frusto-conical portion to form a short cylinder surrounding the pipe and spaced slightly therefrom. A piece of resilient material 19 such as carpeting having a filamented nap or pile surface is fixed to each flange to form a substantially continuous contact with the pipe to be coated. Spaced baffles 20 extend radially inwardly from the inner wall of the sleeve and frusto-conical end portions to a point adjacent the wall of the pipe to be coated. An opening 21 is provided in one of the semicylindrical members 12 or 13 and a cover 22 is hinged at one edge thereof to close the opening. Handles 23 are spaced about the outer surface of the sleeve 11 and extend radially outwardly therefrom whereby the sleeve may be rotated about the pipe 10 and moved lengthwise thereof.

In operation the two smicylindrical members 12 and 13 are placed about the pipe 10 and locked together by the locking catches 14. The sleeve is rotated to bring the opening 21 uppermost above the pipe. The coating material is poured into the sleeve 11 through the opening 21 until the desired level is reached and the door 22 is closed and fastened. The sleeve 11 is then rotated about the pipe and moved lengthwise thereof to apply the coating to the pipe. As the sleeve is rotated, the baffles 20 carry the coating upwardly toward the top surface of the pipe and discharge it over the pipe. At the same time the filaments of the resilient material 19 spread the coating onto the pipe in a level coating and simultaneously carry the excess coating material lengthwise along the pipe within the sleeve.

It is at once apparent that the apparatus of this invention will continue to apply the coating material over the entire pipe surface so long as any remains within the sleeve without the need for maintaining the sleeve constantly full of coating material as has been heretofore necessary. It is also clear that the coating will be leveled and integrated into a single continuous level film by the spreading action of the filaments in a manner heretofore impossible.

While I have illustrated and described a present preferred embodiment and practice of my invention it will be understood that it may be otherwise embodied and practiced within the scope of the following claims.

I claim:

1. A pipe coating apparatus comprising a sleeve adapted to be placed around and spaced radially from the walls of the pipe to be coated, said sleeve being reduced at each end to form an annular flange spaced slightly from the walls of the pipe, baffle means in said sleeve extending lengthwise thereof over substantially the entire length and radially inwardly to a point adjacent the pipe walls and resilient spreader means on each annular flange portion and engaging the pipe walls to be coated, said resilient spreader means having a multiplicity of inwardly extending filaments in engagement with the pipe surface to be coated.

2. A pipe coating apparatus comprising a sleeve adapted to be placed around and spaced radially from the walls of the pipe to be coated, said sleeve being reduced at each end thereof to form an annular flange spaced slightly from the walls of the pipe, baffle means in said sleeve extending lengthwise thereof over substantially the entire length and radially inwardly to a point adjacent the pipe walls and resilient spreader means on each annular flange and engaging pipe walls to be coated, sealable means in the sleeve through which liquid sealing means may be introduced into the interior of the said sleeve and means on the sleeve whereby the sleeve may be rotated about the pipe and moved lengthwise along the pipe.

3. A pipe coating apparatus comprising a plurality of semicylindrical sections hinged together along one edge and adapted to form a cylindrical sleeve about and spaced from a pipe to be coated, said sections being reduced at each end thereof to form an annular flange spaced slightly from the walls of the pipe, baffle means connected to each said section extending lengthwise thereof over substantially the entire length and radially inwardly to a point adjacent the pipe walls and resilient spreader means on each annular flange portion and engaging the pipe walls to be coated, said resilient spreader means having a multiplicity of radially inwardly extending filaments in engagement with the pipe surface to be coated.

4. A pipe coating apparatus comprising a plurality of semicylindrical sections hinged together along one edge and adapted to form a cylindrical sleeve about and spaced from a pipe to be coated, said sections being reduced at each end thereof to form an annular flange spaced slightly from the walls of the pipe, baffle means connected to each said section extending lengthwise thereof over substantially the entire length and radially inwardly to a point adjacent the pipe walls and resilient spreader means on each annular flange portion and engaging the pipe walls to be coated, sealable means in one of said sections through which liquid coating material may be introduced into the interior of the sleeve and means on each section whereby the sleeve may be rotated about the pipe and moved lengthwise thereof.

References Cited in the file of this patent

UNITED STATES PATENTS

| | | |
|---|---|---|
| 2,044,778 | Halstead | June 23, 1936 |
| 2,193,971 | Laurent | Mar. 19, 1940 |
| 2,435,120 | Baker | Jan. 27, 1948 |